April 30, 1929.                J. W. LOWDER                1,710,830
           DISPENSING REFRIGERATOR FOR BOTTLED BEVERAGES
                    Filed July 11, 1928    2 Sheets-Sheet 1
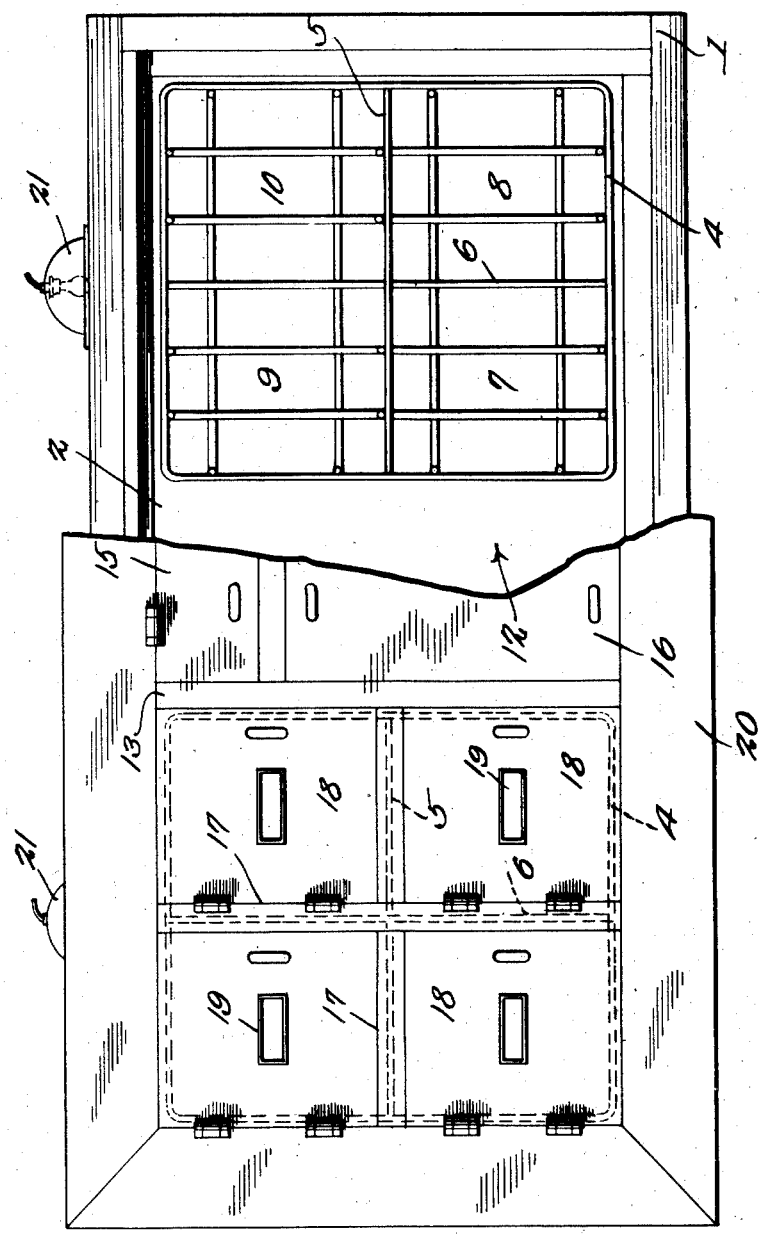

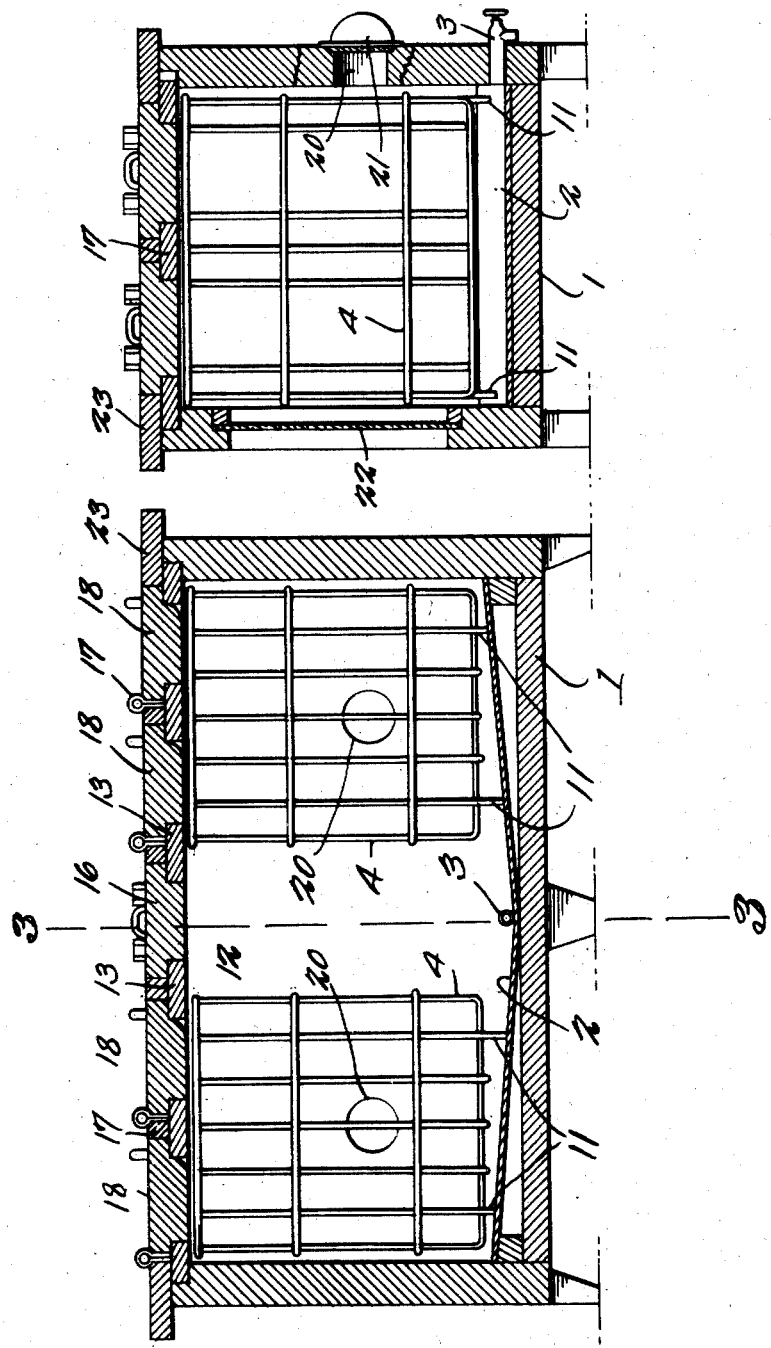

Patented Apr. 30, 1929.

1,710,830

UNITED STATES PATENT OFFICE.

JOHN W. LOWDER, OF BADIN, NORTH CAROLINA.

DISPENSING REFRIGERATOR FOR BOTTLED BEVERAGES.

Application filed July 11, 1928. Serial No. 291,941.

This invention relates to a refrigerator designed primarily for use in dispensing bottled beverages, one of the objects being to provide a simple and compact structure of this type adapted to hold different kinds of beverages where they will be kept at a low temperature, means being employed whereby the beverages of one kind are held separate from beverages of another kind.

A further object is to provide a refrigerator so constructed that any desired kind of beverage can be removed readily.

A further object is to provide a means for holding the bottled beverages in position where they will assist materially in increasing the attractiveness of the display.

Another object is to provide a refrigerator of this character which can be easily replenished and cleaned.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a top plan view of the refrigerator, a portion of the cover being broken away.

Figure 2 is a vertical longitudinal section.

Figure 3 is a section on line 3—3, Figure 2.

Referring to the figures by characters of reference 1 designates a casing of any desired proportions the walls of which can be suitably insulated like the walls of an ordinary refrigerator. As this wall construction constitutes no part of the present invention, the same has not been illustrated in detail. The casing is formed with a false bottom 2 preferably of metal, the said bottom being inclined downwardly from its ends to its center where there is provided a drain valve 3.

Removably mounted in the casing adjacent each end thereof is a basket 4 formed preferably of heavy wire and divided by wire partitions 5 and 6 into separate compartments 7, 8, 9 and 10. Each basket has integral legs 11 adapted to rest upon the inclined false bottom 2 and support the basket in horizontal position.

The baskets are spaced apart so as to leave sufficient room to receive ice, this space being indicated at 12.

The top of the casing is provided with cross strips 13 located above the inner sides of the baskets. These strips, in turn, are connected by a short strip 14 so that a space is left between the rear portions of the strips 13 adapted to be closed by a small lid 15 preferably hingedly mounted. This lid gives access to the rear portion of the space 12 where a surplus stock of bottles containing beverages can be stored. The front portion of the space between the strips 13 is closed by a removable lid 16. When this lid is lifted out of place, ice can be lowered into the space 12.

The space above each of the baskets 6 is divided by strips 17 into separate openings, one of these openings being arranged over each of the compartments in the basket thereunder. Each of the openings is closed by a door 18 and these doors can be hingedly mounted. Furthermore each door can be provided with a name plate or tag holder 19 whereby it can be determined readily what kind of beverage is stored beneath the door.

One or more openings 20 can be formed in the back wall of the casing 1 and back of each of these openings can be located an electric lamp within a housing, this being indicated generally at 21.

In practice bottles containing one kind of beverage are placed in one of the compartments in a basket while bottles containing another kind of a beverage are placed in another compartment. In the structure illustrated eight different kinds of beverages can be stored in the refrigerator. Ice is placed in the space 12 and the baskets can be partly or entirely submerged in water. As the beverages are of different colors, the rays of light projected from the lamps 21 will cause the beverages to sparkle within the water and this sparkling effect will be increased by the ice contained in the water. The front wall of the refrigerator is formed of a transparent window shown at 22. Thus it will be seen that when the refrigerator is filled with bottles of beverages, water and ice and the lamps are lighted, a very attractive display will be produced which will tend greatly to accelerate sales.

A bottle of beverage can be removed from any one of the compartments in the two baskets by opening the door above the compartment in which the beverage is located. As any one of the compartments becomes depleted an added supply of chilled bottles can be placed therein from the storage space 12.

It is to be understood that, if preferred, the entire top of the casing can be removed bodily, this top ordinarily resting freely on the case 1. The frame of the top has been indicated at 23 and all of the doors and cross strips are supported in this frame.

Although this device has been described as using ice, it is to be understood that, if preferred, a suitable refrigerating unit can be arranged between the baskets within the space 12, thereby dispensing with the use of ice and of ice water. This modified arrangement is so obvious that a detailed description or illustration thereof is not deemed necessary.

What is claimed is:

A dispensing refrigerator including a casing having a false bottom inclined downwardly to an intermediate point, a valved drain adajcent the low portion of said false bottom, spaced baskets detachably supported on the false bottom within the end portions of the casing, there being a plurality of compartments within each basket, there being a storage and refrigerant space between the baskets, means for admitting light rays through the baskets and the contents of the casing and baskets, said casing having a transparent wall through which the illuminated contents are exposed, a cover removably mounted on the casing, and separately movable lids carried by the cover, one of said lids being located above each compartment in the baskets and another cover being located above the space between the baskets.

In testimony that I claim the foregoing as my own, I have hereto affixed my signature.

JOHN W. LOWDER.